(12) United States Patent
Lagosanto et al.

(10) Patent No.: US 6,807,561 B2
(45) Date of Patent: Oct. 19, 2004

(54) GENERIC COMMUNICATION FILTERS FOR DISTRIBUTED APPLICATIONS

(75) Inventors: Laurent Lagosanto, Marseilles (FR); Jean-Jacques Vandewalle, Marseilles (FR)

(73) Assignee: Gemplus, Gemenos Cedex (FR)

( * ) Notice: Subject to any disclaimer, the term of this patent is extended or adjusted under 35 U.S.C. 154(b) by 831 days.

(21) Appl. No.: 09/740,987

(22) Filed: Dec. 21, 2000

(65) Prior Publication Data

US 2002/0083142 A1 Jun. 27, 2002

(30) Foreign Application Priority Data

Sep. 8, 2002 (JP) ........................................ 2002-230712

(51) Int. Cl.[7] .............................................. G06F 15/16
(52) U.S. Cl. ...................... 709/203; 709/214; 709/229; 709/230; 714/314; 714/320
(58) Field of Search ................................ 704/203–206, 704/217–219, 226–230, 246; 714/310, 314–320, 330; 707/10

(56) References Cited

U.S. PATENT DOCUMENTS

| | | | | |
|---|---|---|---|---|
| 5,124,909 A | * | 6/1992 | Blakely et al. | 709/203 |
| 5,794,039 A | * | 8/1998 | Guck | 709/203 |
| 6,078,948 A | * | 6/2000 | Podgorny et al. | 709/204 |
| 6,202,096 B1 | * | 3/2001 | Williams et al. | 709/230 |
| 6,345,300 B1 | * | 2/2002 | Bakshi et al. | 709/229 |
| 6,633,923 B1 | * | 10/2003 | Kukura et al. | 709/203 |

\* cited by examiner

*Primary Examiner*—Bharat Barot
(74) *Attorney, Agent, or Firm*—Burns, Doane, Swecker & Mathis, L.L.P.

(57) ABSTRACT

A mechanism is provided that enables an application to interact directly with certain types of communication messages, while at the same time retaining the advantages of a semantics-based framework, such as remote method invocation. A set of standard entry points are defined that can be employed by any application to receive and interact with communication messages. In one implementation of the invention, three such entry points are established as invokable methods that are called within the application. These three methods respectively relate to data processing operations, pre-processing operations and post-processing operations.

16 Claims, 5 Drawing Sheets

GENERIC COMMUNICATION FILTERS FOR DISTRIBUTED APPLICATIONS

FIELD OF THE INVENTION

The present invention is generally directed to integrated circuit cards, commonly known as "smart cards," and other types of portable electronic devices that are capable of executing applications, such as PDAs and mobile telephones. More particularly, the invention is directed to the use of such devices for hosting services in a distributed computing system.

BACKGROUND OF THE INVENTION

As the use of portable electronic devices with integrated microprocessors becomes more widespread, and the technology pertaining to them advances, the amount and variety of information contained in such devices continues to grow, thereby expanding the potential applications for them. In this regard, one particularly interesting application constitutes the use of these devices, such as smart cards, PDAs, and mobile telephones, as hosts for services in a distributed computing system. In this context, the device stores one or more application programs, e.g., applets in the Java programming language. Each such application has a corresponding client program that communicates with the application stored on the device. Typically, the client program might be stored in a terminal in which the device is inserted, or with which the device otherwise communicates. The client programs and device applications exchange messages with one another, and thereby permit a user at the terminal to employ the services provided by the applications on the device.

Typically, in a distributed computing environment, the client and server portions of an application communicate with one another by means of a predefined set of semantics. One example of such a semantic is a procedure call. Another example of a semantic, in an object-oriented programming environment, is a remote method invocation (RMI). In the context of this latter semantic, the functions, or methods, that can be performed by the server program are published, e.g. through an application programming interface, and the client program interacts with the server program by invoking these methods, and providing any parameters that are associated with the invocation. The server program performs the operation that was requested by the client, and returns a result. This protocol facilitates the development of new client programs, since the program developer need only be aware of the published methods for the server program, and write appropriate calls to invoke those methods.

When using a portable electronic device as a host for distributed services, the device may be required to communicate with the client by means of a specific protocol. In the context of a smart card, for instance, the card and the terminal must communicate with one another in accordance with the standards that are applicable to smart cards. Specifically, ISO/IEC 7816-4 specifies that the card and the terminal communicate with a message structure known as the application protocol data unit (APDU). Messages are exchanged as a command and response pair. In the development of applications for the smart card environment, therefore, the program developer was required to be familiar with this message structure, and incorporate code into the program which conforms to the applicable protocol. For instance, the software on the smart card had to include program code which operated to decode command APDUs and encode response APDUs. On the terminal side of the application, the software had to include program code which performed the corresponding inverse operations. Consequently, the development of application programs that were designed to operate on smart cards was quite complex.

To alleviate this burden in the development of applications for smart cards, semantic frameworks have been proposed. For instance, an RMI framework enables programmers to deal with the card applications at the level of method invocations, and not concern themselves with the APDU message passing mechanism. In essence, this result is accomplished by the use of a client proxy at the terminal side of the system. When the client program invokes a method, this invocation is presented to the proxy. The proxy converts the method into the appropriate APDU message, which is then transmitted to the card. At the card, a skeleton program performs the inverse function of the proxy, and transforms the received APDU messages back into the appropriate method calls. These calls are then presented to the on-card application, which returns a corresponding result.

To facilitate the generation of the client proxy and the card skeleton in the Java programming language developed by Sun Microsystems, a programming tool such as a Stub Generator can be made available to programmers. In the context of smart cards, for example, a Stub Generator which is adapted to a subset of Java that is executed on a smart card, known as Java Card, can be employed. In the development of a service that is to be available from a smart card, the programmer develops the implementation of that service, namely, the actual steps of the program that perform the service, as well as an interface which defines entry points of the application on the card, i.e. the list of methods that are available from the implementation. The Stub Generator tool that is adapted to Java Card then generates the client proxy and the card skeleton from the definitions provided via the interface, to provide the appropriate conversions between the published methods and corresponding APDU messages. The card application, which consists of the implementation code, the interface and the card skeleton, is then installed on the card, and client programs are developed which communicate with the client proxy to invoke the methods available through the card service.

The use of the client proxy and card skeleton to facilitate the transport level communications between the terminal and the card provides a number of advantages. First, the card applications can be written in a known language, e.g. the Java programming language. The proxy and skeleton make the APDU protocol transparent to the operation of the program. Consequently, the program developer is not required to have any knowledge of this protocol. As a result, the smart card can be readily integrated into a distributed computing model, rather than having to be treated as a special device.

However, in the context of a smart card, there may be some situations in which it is desirable for the APDU messages to be handled at the application level, rather than in the skeleton. For example, one of the most significant features associated with a smart card is the security that it provides for various transactions. To provide such security, the smart card may encrypt and decrypt the APDU messages, and/or add a signature to each APDU message. To maintain the security level associated with these procedures, it may be preferable to have the encryption and decryption, and/or the validation of signatures, handled within the application itself, rather than develop a specific proxy and skeleton to handle these functions. Further in this regard, it would be difficult to employ a program generation tool, such as the Stub Generator, to automatically produce the required proxy and skeleton. Such a tool would have to be very powerful, and hence complex, since it would have to be familiar with all of the requirements of all of the applications for these types of security services, if it is to operate effectively.

In another situation, it may be the case that older, legacy terminals do not employ the services of a client proxy or an application interface. As a result, these terminals are only capable of communicating by means of the APDU messaging protocol. For instance, the GSM specification for mobile telephones is not based on the Java programming language, and therefore does not employ semantics such as remote method invocation. In such a case, an application which relies solely upon a card skeleton to provide such semantics would not be able to communicate with a legacy terminal.

To address these types of situations, various solutions can be envisioned. As one approach, it is possible to forbid any interaction with the communication messages at the application level, and require them to be handled solely by the skeleton. This approach is not entirely satisfactory, however, because it requires all communication modes to be defined in advance within the skeleton. Since the skeleton is fixed once it has been generated, it would not be able to deal with new advances that are subsequently developed, e.g. a different security protocol.

As an alternative approach, it is possible to permit application developers to modify the skeleton. Thus, as new security procedures are implemented, the skeleton can be adapted to recognize and convert APDU messages associated with the new procedures. Similarly, the skeleton can be modified to handle APDU messages that are sent from legacy terminals. Again, however, this approach presents its own set of problems. First, the modification of the skeleton may prove to be difficult if it is to continue to operate in an error-free manner. Secondly, the programming results that go into the modification may not be reusable, resulting in the expenditure of additional time and effort each time a skeleton is to be modified to accommodate a revision to an application.

SUMMARY OF THE INVENTION

As a solution to the foregoing situations, therefore, it is preferable to provide a mechanism that enables an application on a portable electronic device to interact directly with certain types of APDU communication messages that conform to a protocol associated with that device, while at the same time retaining the advantages of a semantics framework. In accordance with the present invention, this objective is accomplished by defining a set of standard entry points that can be employed within an application to receive and interact with protocol-compliant messages. In one implementation of the invention, three such entry points are established as semantics that can be implemented by the application. These three semantics respectively relate to data processing operations, pre-processing operations and post-processing operations.

In the context of a smart card, for example, when the skeleton receives an APDU message from a terminal, it determines whether the card application is capable of pre-processing APDU messages. If so, it forwards the message as part of a request to perform such pre-processing. The application performs any necessary pre-processing, e.g. it decrypts the APDU message, and then returns it to the skeleton. The skeleton then determines if the received APDU message is one which calls a procedure or invokes a method. If so, the message is decoded and the procedure call or method invocation is issued to the application. Alternatively, if the message is not one which is recognized by the skeleton, such as a message from a legacy terminal, it is forwarded to the application with a request to process it. When the application returns a value in response to an invoked method, the skeleton encodes it into an APDU message in the normal manner, and then presents it to the application for any appropriate post-processing that may be required. The final result from the application is then forwarded to the terminal as an APDU response message.

Thus, the present invention provides a mechanism by which an application program can be enabled to directly interact with APDU messages, without requiring its associated skeleton to recognize and convert those messages. The skeleton only needs to discriminate between APDU messages that pertain to semantics defined in the application interface and those which do not, and forward the latter types of messages to the entry points that are implemented by the application.

Further features of the invention, and the advantages provided thereby, are explained in detail hereinafter with reference to exemplary embodiments of the invention illustrated in the accompanying drawings.

DETAILED DESCRIPTION

To facilitate an understanding of the present invention, it is described hereinafter with reference to specific implementations thereof. In particular, references are occasionally made to embodiments of the invention in which the application which provides services to a user is implemented as a Java applet which is stored on a smart card, and employs remote method invocation (RMI) from a client to execute its functionality. It will be appreciated, however, that the practical applications of the invention are not limited to this particular embodiment. Rather, the principles which underlie the invention can be employed in connection with other types of semantics, as well as in a variety of different embodiments in which a portable device having application processing capabilities is used to provide services in a distributed computing environment.

Figure 1:
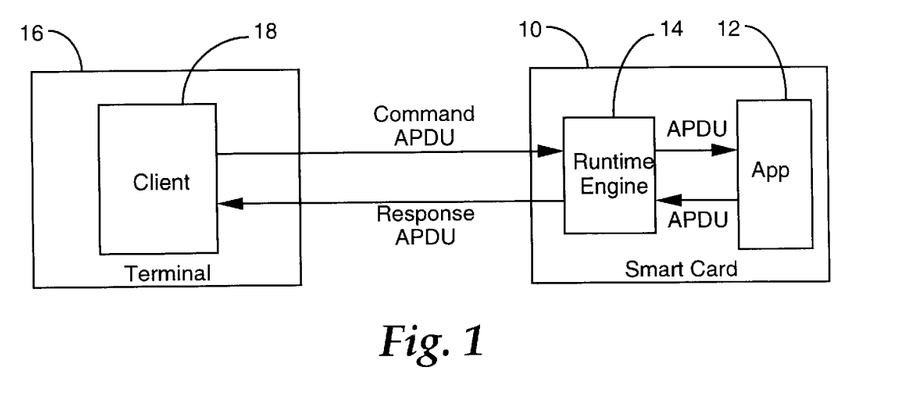
FIG. 1 is a general block diagram of the interaction between a client program in a terminal and an application program that is resident on a smart card.

FIG. 1 is a block diagram of the general process that occurs when a smart card, or similar type of portable device with application processing capabilities, such as a personal digital assistant (PDA), or a mobile telephone, is employed in a distributed computing environment to provide services. One example of such a service is a bank account application, which may enable an authorized holder of the device to check an account balance, make a deposit to the account, and/or withdraw funds from the account. Stored on the device 10 is an application 12 which provides these types of services. If the application is written in the Java programming language, for example, it can be in the form of an applet that operates in conjunction with a Java Card runtime engine 14, which also executes on the device.

The device 10 is connected to a terminal 16 for communication therewith. The communication between the device and the terminal may be carried out by means of physical contact between the device and in the terminal. Alternatively, the communication may take place in a contactless, i.e. wireless, manner. A client application 18 is stored at the terminal, and exchanges messages with the device application 12 to provide services to a user. For example, if the client program relates to the bank account application, it may display a suitable interface to the user which enables the user to provide input relating to account balances, deposits and withdrawals.

In the embodiment illustrated in FIG. 1, the client program 18 communicates directly with the device application 12 by means of messages that conform to the standards for communication between that device and a terminal. If the device is a smart card, for example, these messages comprise APDU command and response messages. Thus, for example, if the user enters a request to obtain an account balance, the client program 18 generates a command APDU message which is received by the runtime engine 14. The runtime engine recognizes the message as one that pertains to the bank account application, and therefore forwards the APDU message to the application 12, with a command to process it. The application 12 responds to the message by returning a value, in this case the current account balance, in the form of an APDU response message. The runtime engine 14 recognizes this message as a response to the message received from the terminal, and therefore forwards it to the terminal as an APDU message. Upon receipt, the client program 18 decodes the APDU message to obtain the account balance, which it then displays to the user.

Figure 2:
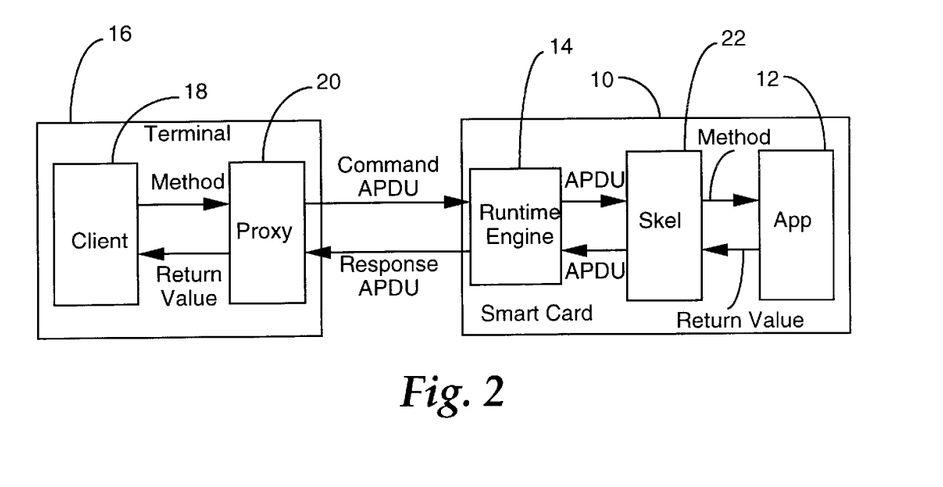
FIG. 2 is a block diagram of the interaction between a terminal and a smart card which employs the RMI framework.

FIG. 2 is a block diagram illustrating an alternative implementation which employs a framework for a predefined set of programming semantics to provide a level of abstraction between the client/card application interaction and the low-level messaging protocol. For instance, the predefined set of semantics could be remote method invocation (RMI). In this implementation, the client program 18 issues a call which invokes a method that is available through the device application 12. This call is not transmitted directly to the device 10. Rather, it is provided to a client proxy 20, which encodes the method into an appropriate form. Referring again to the example where the device is a smart card, the call is converted into an APDU command message. This APDU message is transmitted to the card, where it is received by the runtime engine 14. Upon recognizing the message as one which is intended for the card application 12, the runtime engine provides it to a card skeleton 22, which decodes the APDU message in an inverse manner from the encoding that was employed in the client proxy 20. The decoded message is then forwarded to the card application 12 as a request to invoke a method.

Upon processing the request from the client, the card application 12 returns a value to the card skeleton 22. The skeleton converts this value into an APDU response message, which is transmitted to the terminal, via the runtime engine. At the terminal, the client proxy 20 receives the APDU response message, and decodes it into the value returned by the card application 12, which is then provided to the client program 18.

Figure 3:
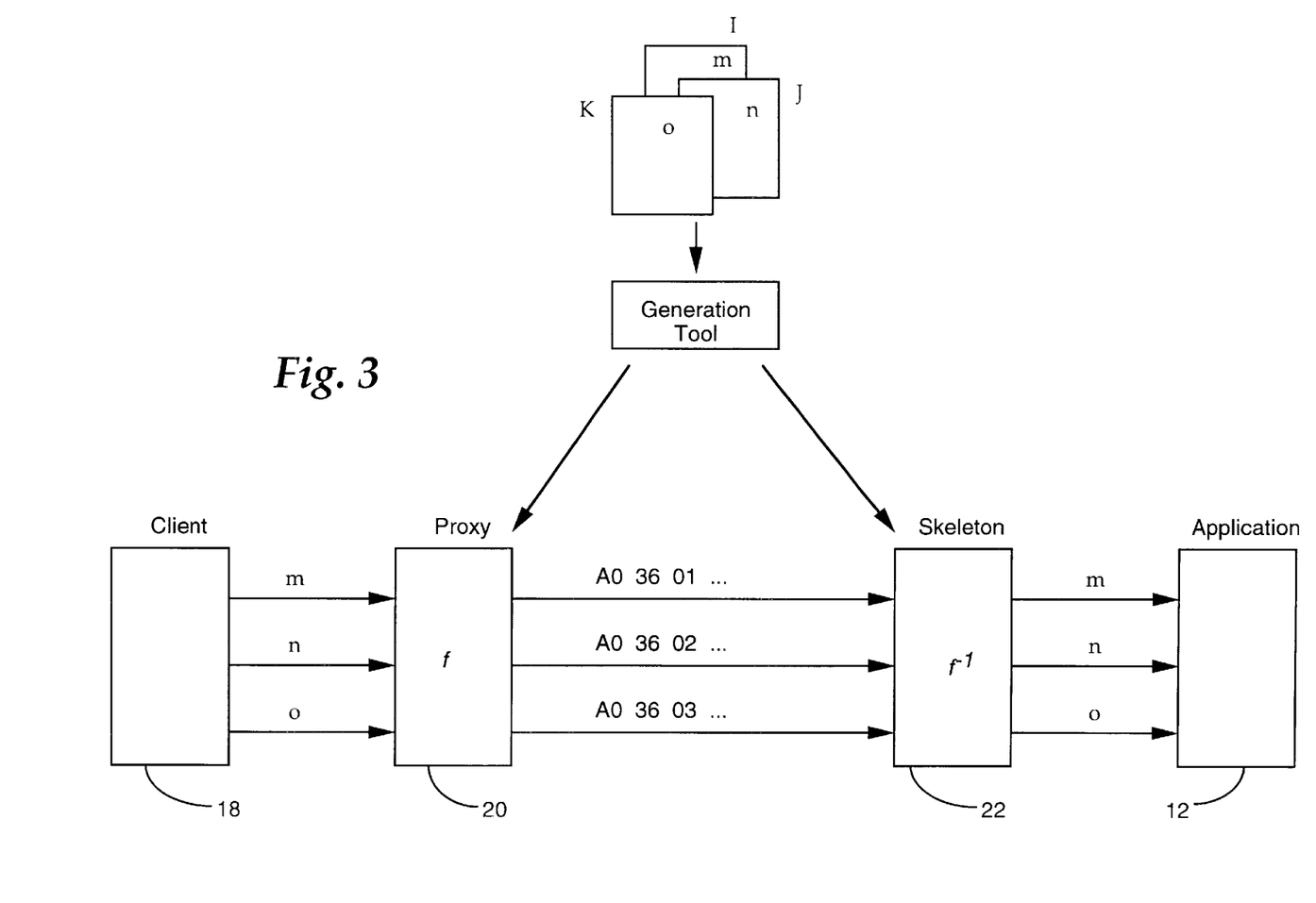
FIG. 3 is a more detailed block diagram of the messages that are exchanged between the client program and the card application in accordance with the RMI framework.

FIG. 3 provides a more detailed illustration of the relationship between the client program 18, the client proxy 20, the card skeleton 22 and the card application 12. The card application has a set of associated interfaces, which, in the illustrated example, are labeled I, J and K. Each interface specifies one or more methods that are implemented by the card application 12. In the illustrated example, the methods which can be implemented by the application are labeled m, n and o, and are respectively defined by the interfaces I, J and K. These methods are referenced by the client program 18, to invoke services from the card application 12.

The methods defined by the set of interfaces are used to construct a mapping between these methods and APDU messages. The proxy 20 encodes methods invoked by the client program 18 into corresponding APDU command messages, and the card skeleton 22 decodes the APDU messages back to the corresponding methods. In the illustrated example, therefore, the method m is mapped to the APDU message (A0 36 01. . . ), the method n is mapped to the APDU message (A0 36 02. . . ), and the method o is mapped to the APDU message (A0 36 03. . . ). The client proxy 20 and the card skeleton 22 which perform these mappings can be automatically generated by a program generation tool, such as a Stub Generator adapted to Java Card. The transfer function $f^1$ for the card skeleton is the inverse of the transfer function $f$ for the card proxy, to provide reliable mapping between the methods and the APDU messages.

Figure 4:
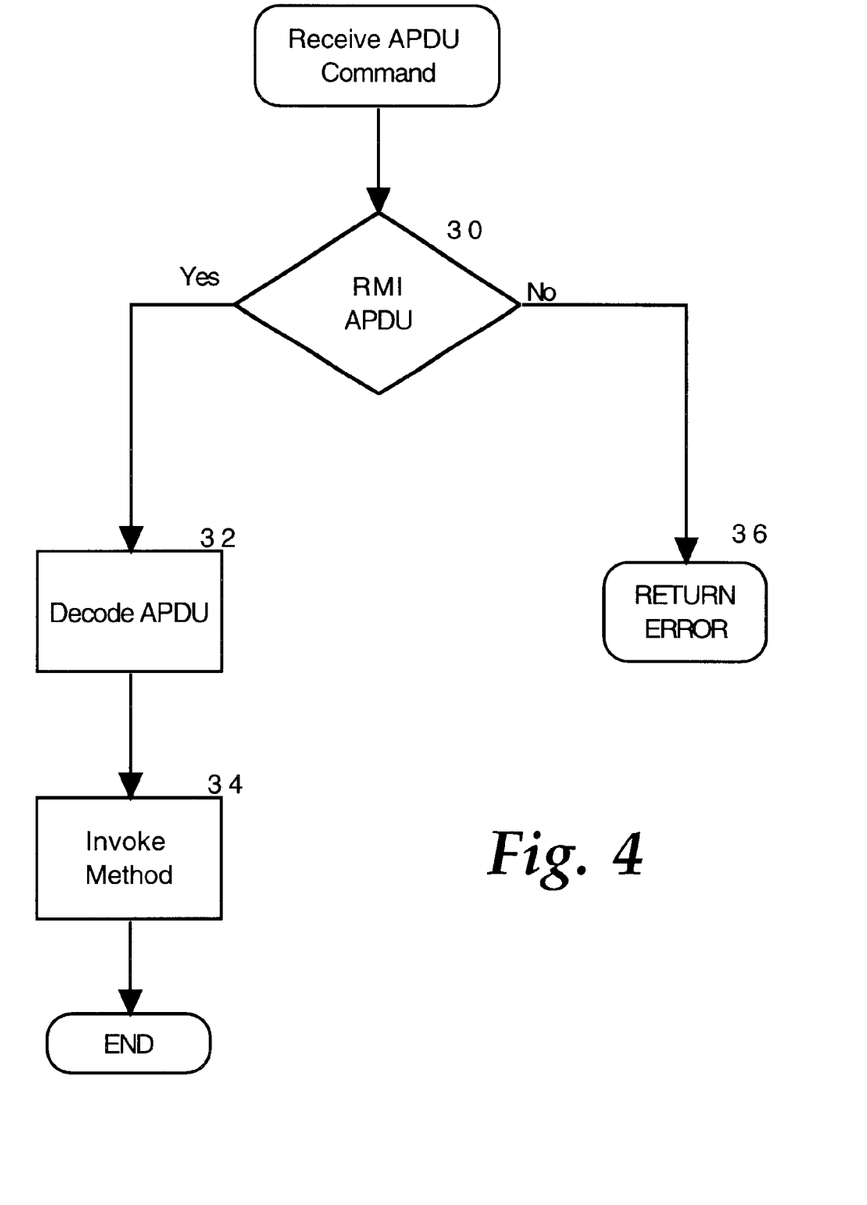
FIG. 4 is a flow chart of the conventional operation of a card skeleton.

In this type of situation, the application 12 does not interact with communication messages, e.g., APDUs. Furthermore, the skeleton 22 only deals with messages that pertain to the published methods that are implemented by the application 12. The operation of the skeleton in this context is depicted in the flow chart of FIG. 4. Referring thereto, when an APDU command message is received, the skeleton determines at step 30 whether the message is associated with remote method invocation. If so, the message is decoded at step 32, and the method is invoked on the application at step 34. If, however, the message is not recognized at step 30 as one which pertains to remote method invocation, e.g., it does not map to one of the known methods, an error condition is indicated at step 36. Thus, the application is only presented with requests to invoke methods that are defined by its interface.

As discussed previously, however, there may be situations in which it is desirable for the application to be able to directly interact with the messages that are exchanged with the terminal, rather than have them decoded or rejected by the skeleton. Two examples of such situations are where the application performs some form of a filtering operation on the messages, e.g., decrypt and/or authenticate the messages, and where the messages are not related to remote method invocation, but rather are legacy messages sent by terminals. In the conventional operation depicted in FIG. 4, such capabilities are not possible.

In accordance with the present invention, these limitations are overcome by defining a set of standard entry points that enable the application to directly interact with the communication messages, while maintaining compliance with the RMI framework. According to one embodiment of the invention, three entry points are defined which respectively relate to data processing operations, pre-processing operations, and post-processing operations. The entry point for data processing operations accommodates legacy messages from terminals, for example, where the messages themselves must be handled by the application, since they do not pertain to methods that are recognized by the skeleton. The entry points for the pre-processing and post-processing operations provide the application with the ability to perform various types of filtering on the messages, such as decrypting or validating incoming messages, and encrypting or signing outgoing messages.

A given application can implement any one or more of the entry points in the set. For instance, if an application is developed which communicates with legacy terminals, but does not handle the security issues, it might implement only the data processing entry point. Conversely, another application might implement the pre-processing and post-processing entry points, but not the data processing entry point. When a skeleton is being generated, it only needs to be aware of the particular entry points that are implemented in the application, to process the received messages appropriately.

Figure 5:
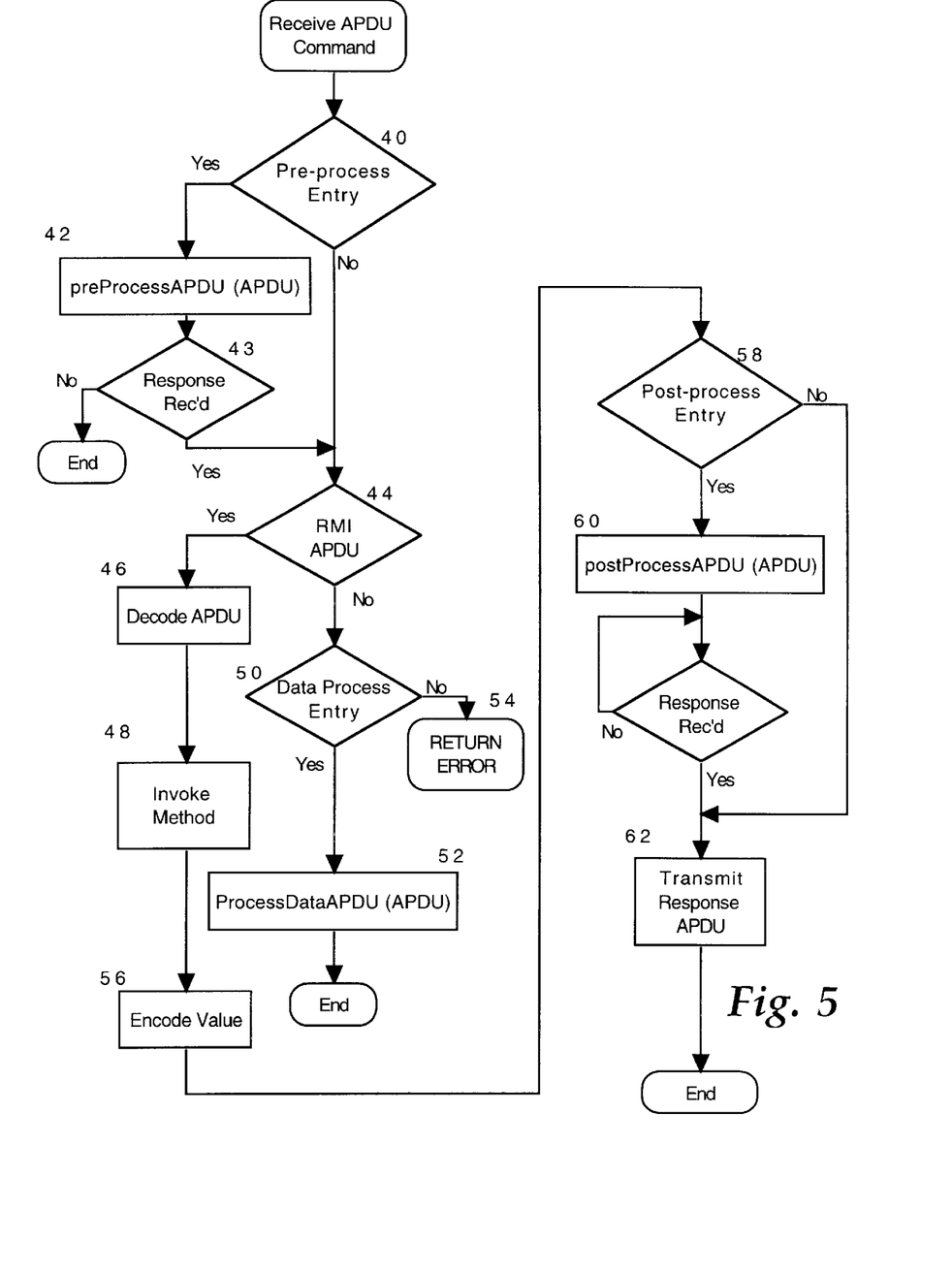
FIG. 5 is a flow chart of the operation of the card skeleton in accordance with the present invention.
Figure 6:
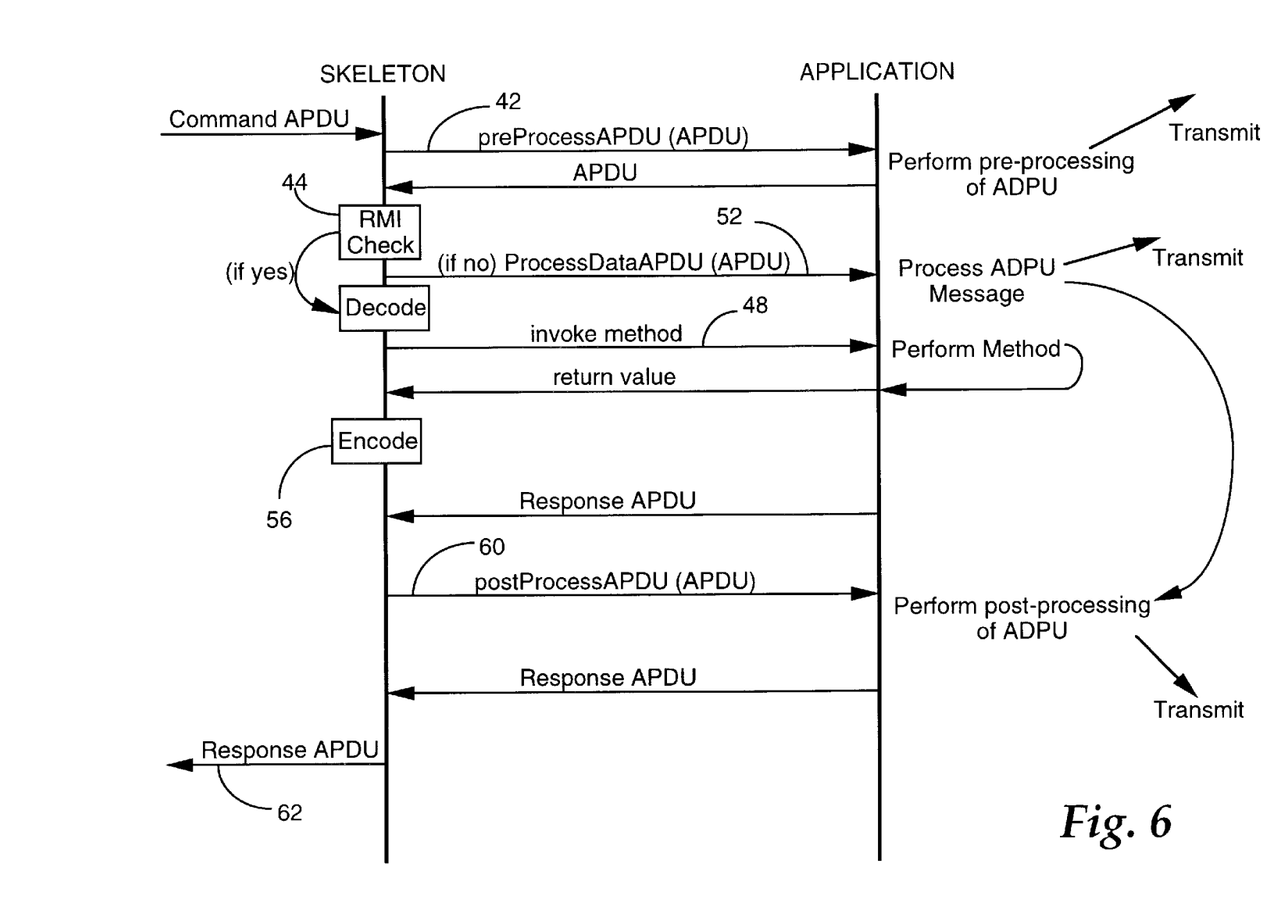
FIG. 6 is a flow diagram of the interaction between the card skeleton and the card application in accordance with the present invention.

An example of the invention is illustrated in FIGS. 5 and 6 for the case of an application which implements all three of the entry points. FIG. 5 depicts the operation of the skeleton, and FIG. 6 illustrates the interaction of the skeleton and the application. When a command APDU message is received from the terminal, the skeleton first makes a determination at step 40 whether the application implements the pre-process entry point. In this example, the application does so, and therefore the skeleton forwards the APDU message at step 42 with a request to invoke the pre-process method. The application then performs the appropriate pre-process operation that is required by the content of the message, e.g., decrypt the message, verify a signature, and/or other filtering operations. The result of the pre-processing operation can then be provided to the skeleton, still in the form of an APDU message. Alternatively, the application can transmit the pre-processed APDU message to a different recipient, such as a register in the card or directly to the terminal.

If the application returns the pre-processed message to the skeleton at step 43, it determines at step 44 whether the message is one which relates to RMI. Similarly, if the application does not implement a pre-process entry point, it makes this determination with respect to the original command APDU received from the terminal. If the message relates to RMI, the skeleton decodes the message at step 46, and invokes the appropriate method at step 48. If, on the other hand, the preprocessed or original command APDU message does not relate to RMI, the skeleton determines at step 50 whether the application implements the data processing entry point. If so, the APDU message is forwarded to the application at step 52 with a request to invoke the data processing method. In response, the application processes the content of the APDU message. For instance, it may act upon a command from a legacy terminal, and generate a response APDU. If the application does not implement the data processing entry point, the skeleton indicates an error condition at step 54.

If the skeleton invoked a method at step 48, it awaits a return value from the application, and then encodes it into an APDU response message at step 56. The skeleton then makes a determination at step 58 whether the application implements the post-process entry point. If so, the response APDU is forwarded to the application at step 60, where the appropriate post-processing operations are carried out, e.g., encrypt the message, add a signature, etc. The result of this post-processing can then be returned to the skeleton in the form of an APDU response message, which is forwarded to the terminal at step 62. Alternatively, as in the case of pre-processing, the APDU message can be transmitted to a different recipient.

If the application processed an ADPU message in response to a command at step 52, the result is a response APDU. When the application also implements the post-processing entry point, this response APDU is processed accordingly, e.g. encrypted and/or signed, in the same manner as an ADPU received from the skeleton at step 60. Alternatively, if the application does not implement post-processing, the response APDU can be sent to the skeleton to be returned to the terminal, or transmitted to another application as appropriate.

From the foregoing, therefore, it can be seen that the present invention provides a mechanism by which an application can be provided with low-level communication messages, while operating within a semantic framework. In this context, the skeleton only needs to be aware of the limited number of entry points that are implemented by an application, and does not have to process any messages which do not relate to its normal function of invoking methods on the application. Consequently, minimal effort is required to generate the skeleton.

In accordance with a further feature of the invention, the procedures for processing the communication messages need not be written into the application program 12. Rather, shared libraries can be included on the smart card or other device to provide the necessary default behavior. For example, a smart card may contain multiple application programs, all of which employ the security features of the smart card platform. Instead of having each application program include the appropriate functions to deal with command APDUs that relate to security functions, the applications can employ the services of a library that takes care of the necessary encryption/decryption, verification and signature, etc. Thus, the developer of the application program can concentrate on the functions of that application itself, and need not be concerned with the specifics of processing the communication messages that are received.

It will be appreciated by those of ordinary skill in the art that the present invention can be embodied in other forms without departing from the spirit or essential characteristics thereof. For instance, while examples of the invention have been described in the context of smart card messaging, the practical applications of the invention are not limited thereto. Rather, they are applicable to any environment in which it is desirable to process message structures within the general framework of remote method invocation, remote procedure calls or any other semantics for message processing.

The presently disclosed embodiments are therefore considered in all respects to be illustrative, and not restrictive. The scope of the invention is indicated by the appended claims, rather than the foregoing description, and all changes that come within the meaning and range of equivalents thereof are intended to be embraced therein.

What is claimed is:

1. A method for interacting with communication messages that conform to a predetermined protocol in an application program that operates in accordance with a set of semantics for message processing, comprising the steps of:

receiving a communication message and, in response thereto, determining whether the application program implements at least one entry point for messages that conform to the predetermined protocol;

forwarding the received message to the application program if a determination is made that the application program implements said entry point;

processing the forwarded message by means of the application program and returning a response as a message which conforms to said predetermined protocol;

determining whether a received message corresponds to a semantic that can be processed by the application program and, if so, converting the message into a command to process the semantic; and processing the semantic within the application program in response to said command.

2. The method of claim 1 wherein said set of semantics comprise remote method invocation.

3. The method of claim 1 wherein said set of semantics comprise remote procedure calls.

4. The method of claim 1 wherein entry points are defined for at least three procedures which respectively relate to pre-processing a message that conforms to said predetermined protocol, processing the data content of a message that conforms to said predetermined protocol, and post-processing the data contained in a message that conforms to said predetermined protocol.

5. The method of claim 1 wherein a procedure for processing a forwarded message is contained in a library that is separate from the application program.

6. The method of claim 1 wherein the application program is contained on a smart card, and said communication messages comprise APDU messages.

7. The method of claim 1 wherein said receiving, forwarding and determining steps are carried out in a skeleton that functions to convert received messages that conform to said predetermined protocol into commands to process semantics and provide said commands to said application program, and converts return values from the application program into messages that conform to said predetermined protocol for transmission.

8. A computing system, comprising:

a first program that communicates with other programs by exchanging messages that conform to a predetermined communication protocol;

an intermediary program that receives messages generated by the first program and selectively converts said messages into requests that conform to a set of semantics; and an application program which accepts said requests and processes the semantics, and further implements at least one entry point for direct acceptance and processing of messages that conform to said predetermined communication protocol;

wherein, in response to receipt of a message, said intermediary program determines whether said application program implements an entry point for acceptance of the message, and directly forwards the message to the application program without converting it into a request that conforms to said semantics.

9. The system of claim 8, further including a library which is separate from and referenced by said application program to provide a procedure for processing a message forwarded to the application program.

10. The system of claim 8 wherein said intermediary program and said application program are contained on a smart card, and said messages comprise APDU messages.

11. The system of claim 8 wherein said set of semantics comprises remote method invocation.

12. The system of claim 8 wherein said set of semantics comprises remote procedure calls.

13. The system of claim 8, wherein said intermediary program and said application program are contained on a portable device.

14. The system of claim 13, wherein said portable device is a smart card.

15. The system of claim 13, wherein said portable device is a personal digital assistant.

16. The system of claim 13, wherein said portable device is a cellular telephone.

* * * * *